(12) United States Patent
Higashino et al.

(10) Patent No.: US 6,890,996 B2
(45) Date of Patent: May 10, 2005

(54) BRANCHED POLYVINYL IMIDAZOLINE ACID SALT, POLYMERIC FLOCCULANT COMPRISING SAME, AND PROCESS FOR PREPARING SAME

(75) Inventors: Toshiya Higashino, Aichi-ken (JP); Shinji Shimosato, Aichi-ken (JP)

(73) Assignee: Tosoh Corporation, Shinnanyo (JP)

( * ) Notice: Subject to any disclaimer, the term of this patent is extended or adjusted under 35 U.S.C. 154(b) by 138 days.

(21) Appl. No.: 10/438,871

(22) Filed: May 16, 2003

(65) Prior Publication Data

US 2003/0204024 A1 Oct. 30, 2003

Related U.S. Application Data

(62) Division of application No. 09/709,408, filed on Nov. 13, 2000, now abandoned.

(30) Foreign Application Priority Data

Nov. 12, 1999 (JP) .............................. 11-322253
Sep. 19, 2000 (JP) ....................... 2000-288884
Oct. 11, 2000 (JP) ....................... 2000-316837

(51) Int. Cl.⁷ ................................................ C08F 8/32
(52) U.S. Cl. .............................. 525/329.1; 525/329.2; 525/355; 525/382; 526/310
(58) Field of Search .......................... 525/329.1, 329.2, 525/355, 382; 526/310

(56) References Cited

U.S. PATENT DOCUMENTS

| | | |
|---|---|---|
| 3,300,406 A | 1/1967 | Pollio |
| 3,376,159 A | 4/1968 | Drennen et al. |
| 3,406,139 A | 10/1968 | Hurwitz et al. |
| 4,479,879 A | 10/1984 | Hashimoto et al. |
| 5,589,264 A | 12/1996 | Yoon et al. |
| 6,294,615 B1 | 9/2001 | Higashino et al. |

FOREIGN PATENT DOCUMENTS

| | | |
|---|---|---|
| GB | 1 056 791 | 1/1997 |
| JP | 61-83207 | 4/1986 |
| JP | 2000-191733 | 7/2000 |

OTHER PUBLICATIONS

"Kobunshi Kagaku", vol. 10, Dec. 25, 1953, p. 512 (abstract only).
Kobunshi Kagaku, vol. 10, Dec. 25, 1953, p. 517, lines 15–18 (abstract only).
Chemical Abstracts, Columbus, OH, USA, Chemical Society, vol. 8, No. 100, Feb. 1, 1984, XP–002071630, p. 16.
Patent Abstract of Japan, JP11–181023, vol. 1999, No. 12, Jul. 6, 1999.
Patent Abstract of Japan, JP10–259209, vol. 1998, No. 14, Sep. 29, 1998.
Flory, "Principles of Polymer Chemistry", Cornell University Press, Ithaca, NY, pp. 256–260, 1953.

*Primary Examiner*—Bernard Lipman
(74) *Attorney, Agent, or Firm*—Oblon, Spivak, McClelland, Maier & Neustadt, P.C.

(57) ABSTRACT

The present invention provides a branched polyvinyl imidazoline acid salt which, when used in waste water treatment, especially sewage treatment, forms flocs and decreases the water content of a dehydrated cake, a polymeric flocculent comprising the branched polyvinyl imidazoline acid salt, and a process for preparing the branched polyvinyl imidazoline acid salt. The branched polyvinyl imidazoline acid salt has a Huggins' constant k' of 0.2 to 1.2 and an intrinsic viscosity $[\eta]$ of 2 to 20 based on measurements at 30° C. in a 0.1 mol/l aqueous solution of sodium chloride.

17 Claims, 1 Drawing Sheet

BRANCHED POLYVINYL IMIDAZOLINE ACID SALT, POLYMERIC FLOCCULANT COMPRISING SAME, AND PROCESS FOR PREPARING SAME

BACKGROUND OF THE INVENTION

The present invention relates to a branched polyvinyl imidazoline acid salt, a polymeric flocculant comprising the branched polyvinyl imidazoline acid salt, and a process for preparing the branched polyvinyl imidazoline acid salt.

Polymeric flocculants are used in waste water treatment, such as sewage treatment, excrement treatment, and that in the food industry, the paper and pulp industries, and various other industries. A polymeric flocculent is added to and mixed with sludge occurring after bioremediation of waste water to form flocs. After separation of the solids and liquid, the resulting cake is dehydrated. The dehydrated cake is burned or dumped for disposal. Recent years have seen the trend that sludge from waste water treatment, especially sewage treatment, is difficult to flocculate and dehydrate, for reasons such as the extension of a sludge transport pipe due to improvement in the living standard and integration of treatment facilities. As a result, the water content of the dehydrated cake increases, the volume of the dehydrated cake increases, and the cost for treatment, such as incineration cost, increases. Environmental problems also arise, such as increases in the amount of a carbon dioxide gas in accordance with increases in the amounts of fuel oils necessary for incineration. To solve these problems, a demand is growing for polymeric flocculants with excellent dehydration performance.

The properties of polymeric materials depend heavily on their constituent units, molecular weight, molecular weight distribution, and degree of branching. In polymeric materials used as polymeric flocculants, in particular, their performance as polymeric flocculants is known to be markedly improved by increasing their constituent units and molecular weights.

Polyvinyl imidazoline and/or its acid salt have or has been put to uses as flocculants (Japanese Patent Publication No. Sho 42-9653). However, when such a compound is used as a flocculant, especially as a polymeric flocculent for organic sludge for use in sewage treatment, its performance is not necessarily sufficient. To overcome this drawback, a polymeric flocculant comprising a novel copolymer has been proposed (Japanese Unexamined Patent Publication No. 2000-191733), but its performance as a polymeric flocculent has not been improved sufficiently.

As discussed above, acid salts of polyvinyl imidazoline have not exhibited sufficient performance when used as polymeric flocculants in waste water treatment, especially sewage treatment. In waste water treatment, especially in sewage treatment, sludge resulting from bioremediation tends to be flocculated and dehydrated with difficulty. This leads to increases in the water content of the dehydrated cake, the volume of the dehydrated cake, and the cost for treatment, such as incineration cost. There are also environmental problems, such as increases in the amount of a carbon dioxide gas in accordance with increases in the amounts of fuel oils necessary for incineration. Thus, there is an intense demand for polymeric flocculants for decreasing the water content of dehydrated cake in the treatment of sludge having a tendency toward difficult flocculation and dehydration.

SUMMARY OF THE INVENTION

The present invention has been accomplished in view of the above-described problems. It is an object of the invention to provide a branched polyvinyl imidazoline acid salt which, when used in waste water treatment, especially sewage treatment, forms flocs and decreases the water content of a dehydrated cake; a polymeric flocculant comprising the branched polyvinyl imidazoline acid salt; and a process for preparing the branched polyvinyl imidazoline acid salt.

The present inventors conducted extensive studies in an attempt to solve the aforementioned problems. Based on these studies, they discovered a branched polyvinyl imidazoline acid salt, and a polymeric flocculant comprising it, thus completing the present invention.

That is, the invention concerns a branched polyvinyl imidazoline acid salt of the following chemical formula (1), a polymeric flocculant comprising the branched polyvinyl imidazoline acid salt, and a process for preparing the branched polyvinyl imidazoline acid salt:

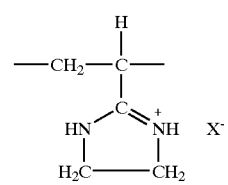
(1)

where $X^-$ denotes a chlorine anion, a sulfuric acid anion, a carbonic acid anion, a p-toluenesulfonic acid anion, a formic acid anion, an acetic acid anion, or a propionic acid anion, the branched polyvinyl imidazoline acid salt having a Huggins' constant k', defined by the equation (1), $$\eta_{sp}/C = k'[\eta]^2 C + [\eta] \tag{1}$$

where $\eta_{sp}$ denotes a specific viscosity, C denotes the concentration of a polymer, $[\eta]$ denotes an intrinsic viscosity, and k' denotes a Huggins' constant, of 0.2 to 1.2 and an intrinsic viscosity $[\eta]$ of 2 to 20 based on measurements at 30° C. in an aqueous solution of 0.1 mol/l sodium chloride.

The invention will be described in detail below.

The branched polyvinyl imidazoline acid salt of the invention is a branched polyvinyl imidazoline acid salt of the above chemical formula (1) which has a Huggins' constant k', defined by the above equation (1), of 0.2 to 1.2 and an intrinsic viscosity $[\eta]$ of 2 to 20 based on measurements at 30° C. in an aqueous solution of 0.1 mol/l sodium chloride.

The degree of branching of the branched polyvinyl imidazoline acid salt of the invention is expressed by the Huggins' constant k' in the equation (1). The Huggins' constant k' is a constant obtained by measurement of the solution viscosity of a polymeric material. This constant is widely used as an index of the degree of branching of a polymeric material. It is known that the higher the degree of branching of a polymeric material, the greater value the Huggins' constant k' takes, while the lower the degree of branching of a polymeric material, the smaller value the Huggins' constant k' takes (Journal of Polymer Science, Vol. 10, 185 (1953); Kobunshi Kagaku, Vo. 10, 512 (1953)).

The branched polyvinyl imidazoline acid salt for use as the polymeric flocculant of the invention has a Huggins' constant k', defined by the above equation (1) based on measurements at 30° C. in an aqueous solution of 0.1 mol/l sodium chloride, of 0.2 to 1.2, preferably 0.3 to 1.0, and more preferably 0.3 to 0.5 from the aspect of performance. If the constant is less than 0.2, the performance obtained is insufficient. If it exceeds 1.2, the solubility of the branched polyvinyl imidazoline acid salt in water lowers.

The branched polyvinyl imidazoline acid salt for use as the polymeric flocculant of the invention has an intrinsic viscosity $[\eta]$, in the above equation (1) based on measurements at 30° C. in an aqueous solution of 0.1 mol/l sodium chloride, of usually 2 to 20, preferably 4 to 15, from the aspect of performance and ease of handling. If the intrinsic viscosity is less than 2, the performance obtained is insufficient. If it exceeds 20, the viscosity of waste water after addition of the compound to the waste water is so high that the waste water becomes difficult to handle.

In connection with the branched polyvinyl imidazoline acid salt for use as the polymeric flocculant of the invention, $X^-$ in the aforementioned chemical formula (1) is a chlorine anion, a sulfuric acid anion, a carbonic acid anion, a p-toluenesulfonic acid anion, a formic acid anion, an acetic acid anion, or a propionic acid anion. In terms of performance, and ease of handling in waste water treatment, a chlorine anion, an acetic acid anion, and a sulfuric acid anion are preferred, and a chlorine anion is particularly preferred.

The polymeric flocculant of the invention is used to flocculate substances suspended in waste water and remove them as flocs. The polymeric flocculent is effective particularly for organic sludge. The organic sludge includes, for example, raw sludge, surplus sludge, concentrated sludge, a mixture of these sludges, digested sludge in excrement treatment, and sludge occurring in activated sludge treatment of industrial waste water other than sewage. The polymeric flocculent of the invention is formed normally into an aqueous solution, and mixed with any of these sludges, whereby flocs can be formed. The resulting flocs are dehydrated by a dehydrator, such as a belt press, a screw press, a filter press, or a super decanter, to obtain a dehydrated cake.

The proportion of the polymeric flocculant of the invention added as a chemical is usually 0.01 to 5.0% by weight, preferably 0.1 to 1.2% by weight, based on the solids content of a slurry containing the sludge to be treated. The pH of the slurry containing the sludge to be treated is preferably 3.5 to 8.0.

A process for preparing the branched polyvinyl imidazoline acid salt of the invention comprises reacting a branched polyacrylonitrile with ethylenediamine in the presence of a catalyst, and contacting the resulting polymer with an acid. The catalyst used in the process for preparing the branched polyvinyl imidazoline acid salt of the invention is ammonium chloride and/or a hydrochloride of an amine. The amine is not restricted, but its examples are aliphatic amines such as methylamine, dimethylamine, trimethylamine, ethylamine, diethylamine, and triethylamine; alicyclic amines such as piperidine, pyrrolidine, and cyclohexylamine; aromatic amines such as pyridine, aniline, dimethylaniline, and diethylaniline; and polyamines such as ethylenediamine, and diethylenetriamine. In the process for preparation according to the invention, ethylenediamine is used as a reactant. Thus, hydrogen chloride may be added to the reaction system to convert ethylenediamine to its hydrochloride.

The branched polyacrylonitrile, a starting material used in the process for preparation in the invention, is not restricted. In consideration of the performance of the resulting polyvinyl imidazoline acid salt as a flocculant, the solubility of the flocculant in water, and reactivity with ethylenediamine, the preferred branched polyacrylonitrile is one having a Huggins' constant k', defined by the above equation (1), of 0.2 to 1.2 and an intrinsic viscosity $[\eta]$ of 2 to 20 based on measurements at 30° C. in N,N-dimethylformamide. Branched polyacrylonitrile having a Huggins' constant k' of 0.3 to 1.0 and an intrinsic viscosity $[\eta]$ of 5 to 15 is more preferred. That having a Huggins' constant k' of 0.3 to 0.5 and an intrinsic viscosity $[\eta]$ of 8 to 15 is particularly preferred.

The branched polyacrylonitrile, a starting material used in the process for preparation in the invention, can be obtained by a publicly known method using an acrylonitrile monomer. A concrete method of polymerization is an ordinary radical polymerization method. Its examples are slurry polymerization using a water soluble redox polymerization initiator in an aqueous medium, solution polymerization using a solvent such as dimethyl sulfoxide, N,N-dimethylformamide, or N,N-dimethylacetamide, suspension polymerization, and emulsion polymerization.

In the process for preparation of the invention, the temperature of the reaction between the branched polyacrylonitrile and ethylenediamine is normally in the range of 60 to 200° C., and preferably in the range of 70 to 180° C. The reaction can take place at a temperature higher than 200° C., but may cause pyrolysis of the starting polyacrylonitrile. With the reaction at a temperature lower than 60° C., the reaction rate is so slow that the necessity of increasing the amount of the catalyst arises. This is not very economical.

In the process for preparation according to the invention, the reaction between the branched polyacrylonitrile and ethylenediamine is performed normally in a liquid phase, and can be carried out at atmospheric pressure or in pressurized state, as long as the starting materials can be maintained in a liquid, dissolved or suspended state. In this reaction, ammonia occurs during the reaction. Thus, the pressure rises in pressurized state, but the resulting ammonia can be removed during the reaction or after completion of the reaction. If the reaction temperature exceeds the boiling points of the raw materials, it is possible to adopt a method, such as execution of the reaction under pressurization, provision of a condenser, or supply of the raw materials little by little.

In the process for preparation according to the invention, the reaction between the branched polyacrylonitrile and ethylenediamine may use, or need not use, a solvent. Any solvents inert under the reaction conditions can be used without limitation.

In the process for preparation according to the invention, the branched polyvinyl imidazoline acid salt is obtained by contacting an acid with the polymer obtained by the reaction between the branched polyacrylonitrile and ethylenediamine. The acid is not restricted, but preferably may be hydrochloric acid, sulfuric acid, carbonic acid, p-toluenesulfonic acid, formic acid, acetic acid, or propionic acid. The method of contacting any of these acids with the polymer obtained by the reaction between the branched polyacrylonitrile and ethylenediamine is not restricted. Examples of the method are a method of adding the acid to the reaction system at completion of the reaction between the branched polyacrylonitrile and ethylenediamine, thereby contacting the acid with the resulting polymer; a method of converting the polymer, which has been obtained by the reaction between the branched polyacrylonitrile and ethylenediamine, into a solid or a solution in a solvent, and contacting the solid or solution with the acid; and a method of demineralizing the polymer obtained by the reaction between the branched polyacrylonitrile and ethylenediamine, and contacting the demineralized polymer with the acid.

To produce the branched polyimidazoline acid salt of the chemical formula (1), where $X^-$ is a chlorine anion, by the preparation process of the invention, the polymer obtained by the reaction between the branched polyacrylonitrile and ethylenediamine may be contacted with hydrochloric acid. However, the amount of ammonium chloride and/or a hydrochloride of an amine used in the reaction between polyacrylonitrile and ethylenediamine may be rendered equivalent to or more than the amount of the acrylonitrile units of the starting polyacrylonitrile, thereby obviating the need for further contact with hydrochloric acid.

The preparation process of the invention may be performed by a continuous reaction, a batch reaction, or a semi-batch reaction. The reaction may use a fixed bed or a suspended bed.

BRIEF DESCRIPTION OF THE DRAWING

The present invention will become more fully understood from the detailed description given hereinbelow and the accompanying drawing which is given by way of illustration only, and thus is not limitative of the present invention, and wherein.

DETAILED DESCRIPTION OF THE INVENTION

Figure 1:
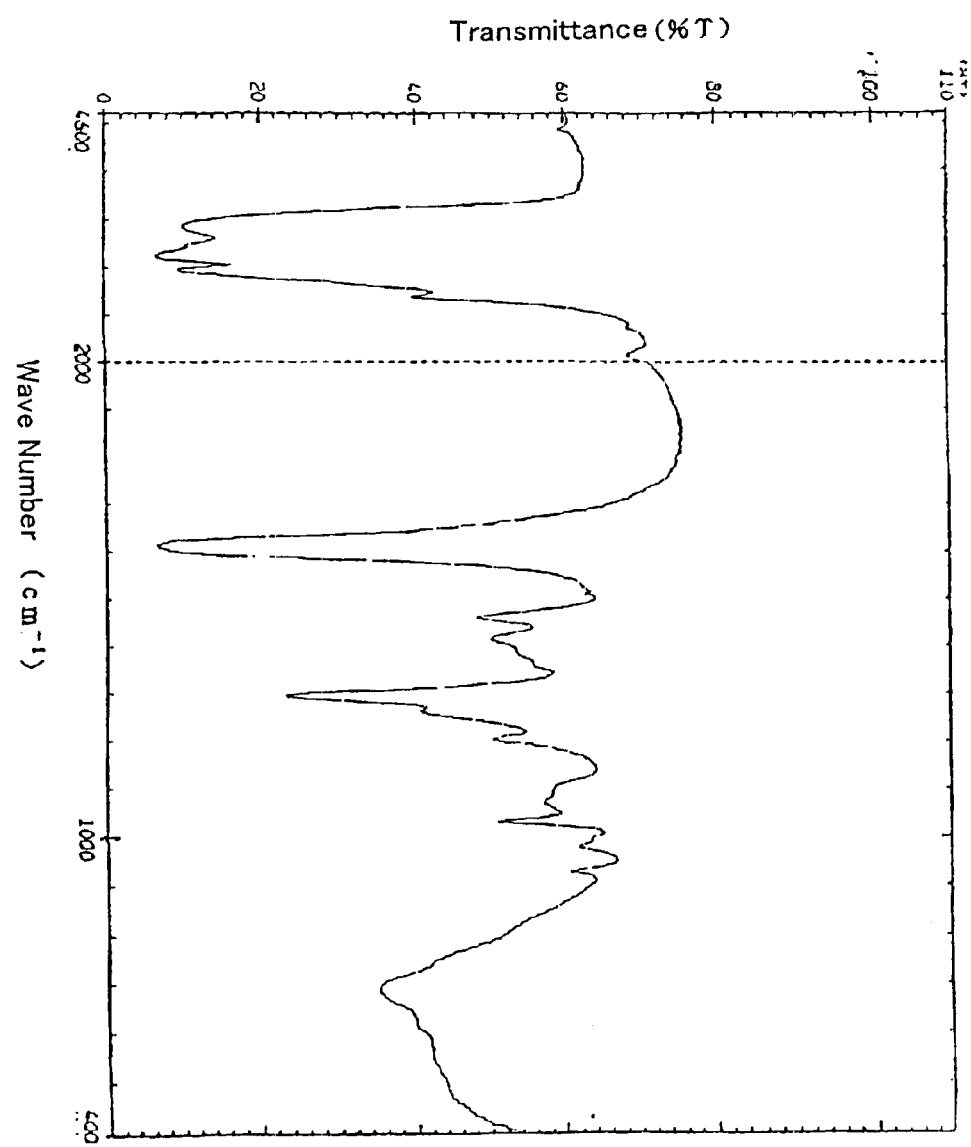
FIG. 1 shows the infrared absorption spectrum of the solid obtained in Example 1.

Preferred embodiments of the present invention will be described by way of the Examples offered below, but the invention is in no way restricted thereby. The branched polyacrylonitriles and branched polyvinyl imidazoline acid salts obtained in the Starting Material Production Examples and the Examples were each measured for the intrinsic viscosity [η] and Huggins' constant k' by the following methods:

<Intrinsic Viscosity [η] and Huggins' Constant k' of Branched Polyacrylonitrile>

Branched polyacrylonitrile to be measured is dissolved in N,N-dimethylformamide at 30° C. to prepare a polymer solution having a predetermined concentration. The specific viscosity $\eta_{sp}$ is determined from the times (in seconds) of falling of the polymer solution and the pure solvent, N,N-dimethylformamide, between bench marks shown on a viscometer such as a Ubbellohde viscometer. Then, a predetermined amount of N,N-dimethylformamide is added to the polymer solution to dilute it. The specific viscosity $\eta_{sp}$ values of five polymer solutions at different dilution ratios are determined from their times (in seconds) of falling between the bench marks shown on the viscometer. Each of the polymer concentrations C is taken on a horizontal axis, and $\eta_{sp}/C$ at each polymer concentration C is taken on a vertical axis. A straight line connecting the respective points together is extrapolated to zero polymer concentration C to find the intrinsic viscosity [η]. The value of the inclination of the straight line at this intrinsic viscosity is k' $[\eta]^2$. The Huggins' constant k' is determined using the previously obtained [η] in the equation (1).

<Intrinsic Viscosity [η] and Huggins' Constant k' of Branched Polyvinyl Imidazoline Acid Salt>

Branched polyvinyl imidazoline to be measured is dissolved in a 0.1 mol/l aqueous solution of sodium chloride at 30° C. to prepare a polymer solution having a predetermined concentration. The specific viscosity $\eta_{sp}$ is determined from the times (in seconds) of falling of the polymer solution and the pure solvent, 0.1 mol/l aqueous solution of sodium chloride, between bench marks shown on a viscometer such as a Ubbellohde viscometer. Then, a 0.1 mol/l aqueous solution of sodium chloride in a predetermined amount is added to the polymer solution to dilute it. The specific viscosity $\eta_{sp}$ values of five polymer solutions at different dilution ratios are determined from their times (in seconds) of falling between the bench marks shown on the viscometer. Each of the polymer concentrations C is taken on a horizontal axis, and $\eta_{sp}/C$ at each polymer concentration C is taken on a vertical axis. A straight line connecting the respective points together is extrapolated to zero polymer concentration C to find the intrinsic viscosity [η]. The value of the inclination of the straight line at this intrinsic viscosity is k' $[\eta]^2$. The Huggins' constant k' is determined using the previously obtained [η] in the equation (1).

The branched polyvinyl imidazoline acid salts obtained in the Examples were each measured for the infrared absorption spectrum and the chlorine content by the following methods:

<Infrared Absorption Spectrum>

Measured by the KBr method at room temperature in a nitrogen atmosphere by use of a Shimadzu Fourier transform infrared spectrophotometer (FTIR-8100M).

<Chlorine Content>

A predetermined amount of the polyvinyl imidazoline acid salt is burned in an oxygen atmosphere. The resulting gas is absorbed to hydrogen peroxide, which is formed into an aqueous solution of a predetermined concentration. The chlorine content of the solution is measured by ion chromatography.

<Performance Evaluation>

The performance evaluation (floc diameter, amount of filtrate after 60 seconds, water content of dehydrated cake) of the resulting polymeric flocculant is made in the following manner:

Mixed raw sludge (solids concentration 2.1% by weight, pH 5.4) from sewage treatment facilities is sampled in an amount of 300 ml into a 500 ml glass beaker. An aqueous solution (0.3% by weight) of each of the polymeric flocculants obtained in Examples 1 to 3 and Comparative Examples 1 to 4 is added in an amount of 15 ml to the glass beaker. The sample is agitated by a jar tester for 20 seconds at 200 rpm to flocculate it. Then, the diameters of flocs are measured visually. The flocculated sludge is naturally filtered for 60 seconds with the use of a polyester filter cloth (woven in a herringbone pattern), and the amount of the filtrate is measured. Then, the flocculated sludge is sandwiched between two of the polyester filter cloths, and dehydrated by a belt press (filter cloth: herringbone weaving, filter cloth tension: 4.00 kg/cm). The resulting dehydrated cake is dried under reduced pressure for 12 hours at 105° C. The water content of the dehydrated cake is calculated from the decrease in the weight of the flocculated sludge after drying compared with its weight before drying.

STARTING MATERIAL PRODUCTION EXAMPLE 1

A 500 ml four-necked flask equipped with a stirrer and a nitrogen introduction tube was charged with 120.0 g of acrylonitrile and 0.3 g of 2,2'-azobis(isobutyronitrile), and these materials were dissolved. An aqueous solution of 0.6 g of polyvinyl alcohol having a saponification degree of 80% in 280.0 g sufficiently nitrogen-purged demineralized water was further charged. The mixture was cooled to 5° C. with stirring in a nitrogen stream. The mixture was further purged with nitrogen for 1 hour, and the internal temperature was raised to 60° C. with stirring. The system was held for 6 hours at 60° C. to obtain a precipitated polymer. The precipitated polymer was separated by filtration, and washed several times with demineralized water and methyl alcohol. The washed filter cake was dried under reduced pressure to obtain 83.5 g (yield 69.6%) of polyacrylonitrile. The resulting polyacrylonitrile had an intrinsic viscosity [η], measured at 30° C. in N,N-dimethylformamide, of 13.5 and a Huggins' constant k' of 0.41.

STARTING MATERIAL PRODUCTION EXAMPLE 2

A 500 ml four-necked flask equipped with a stirrer and a nitrogen introduction tube was charged with 44.0 g of acrylonitrile and 400 g of sufficiently nitrogen-purged demineralized water. The mixture was cooled to 5° C. with stirring in a nitrogen stream. The mixture was further purged with nitrogen for 1 hour, and 0.1 g of potassium persulfate and 0.03 g of sodium hydrosulfite were added. The system was held for 20 hours at 5° C. with stirring. A precipitated polymer was separated by filtration, and washed several times with demineralized water and methyl alcohol. The washed filter cake was dried under reduced pressure to obtain 31.8 g (yield 72.3%) of polyacrylonitrile. The resulting polyacrylonitrile had an intrinsic viscosity [η], measured at 30° C. in N,N-dimethylformamide, of 6.5 and a Huggins' constant k' of 0.30.

STARTING MATERIAL PRODUCTION EXAMPLE 3

The same procedure as in Starting Material Production Example 1 was performed, except that 0.09 of 2,2'-azobis(isobutyronitrile) was used. As a result, 82.8 g (yield 69.0%) of polyacrylonitrile was obtained. The resulting polyacrylonitrile had an intrinsic viscosity [η], measured at 30° C. in N,N-dimethylformamide, of 12.0 and a Huggins' constant k' of 0.49.

STARTING MATERIAL PRODUCTION EXAMPLE 4

The same procedure as in Starting Material Production Example 1 was performed, except, that 0.03 of 2,2'-azobis(isobutyronitrile) was used. As a result, 29.5 g (yield 24.6%) of polyacrylonitrile was obtained. The resulting polyacrylonitrile had an intrinsic viscosity [η], measured at 30° C. in N,N-dimethylformamide, of 7.6 and a Huggins' constant k' of 0.16.

STARTING MATERIAL PRODUCTION EXAMPLE 5

The same procedure as in Starting Material Production Example 1 was performed, except that 0.03 of 2,2'-azobis(isobutyronitrile) was used and the system was held at 60° C. for 4 hours. As a result, 24.7 g (yield 20.6%) of polyacrylonitrile was obtained. The resulting polyacrylonitrile had an intrinsic viscosity [η], measured at 30° C. in N,N-dimethylformamide, of 6.5 and a Huggins' constant k' of 0.10.

STARTING MATERIAL PRODUCTION EXAMPLE 6

A 500 ml four-necked flask equipped with a stirrer and a nitrogen introduction tube was charged with 20.0 g of acrylonitrile and 200 g of sufficiently nitrogen-purged demineralized water. The mixture was cooled to 5° C. with stirring in a nitrogen stream. The mixture was further purged with nitrogen for 1 hour, and 2.0 ml of 0.1 N sulfuric acid and 0.0005 g of ammonium iron (II) hexahydrate were added. The internal temperature was raised to 50° C. with stirring, and 0.05 g of potassium persulfate and 0.25 g of sodium pyrosulfite were added. The system was held for 1 hour at 50° C. to obtain a precipitated polymer. The precipitated polymer was separated by filtration, and washed several times with demineralized water and methyl alcohol. The washed filter cake was dried under reduced pressure to obtain 14.0 g (yield 70.0%) of polyacrylonitrile. The resulting polyacrylonitrile had an intrinsic viscosity [η], measured at 30° C. in N,N-dimethylformamide, of 1.5 and a Huggins' constant k' of 0.32.

EXAMPLE 1

A flask was charged with 10.0 g of the polyacrylonitrile obtained in Starting Material Production Example 1, 100.0 g of ethylenediamine, 12.0 g of ammonium chloride, and 80.0 g of 1-butanol. After purging with nitrogen, the internal temperature was raised to 95° C. with stirring. The system was held at 95° C. for 4.5 hours with stirring, and then cooled. The viscous reaction mixture was taken out, poured into acetone, and washed several times with acetone. The washed mixture was dried under reduced pressure to obtain 22.9 g of a white solid. The resulting solid (5.0 g) was added to 300 ml of a methyl alcohol solution containing 10% by weight of hydrochloric acid. The system was mixed with stirring for 1 hour at room temperature. The mixture was poured into acetone, and washed several times with acetone. The washed mixture was dried under reduced pressure to obtain 4.5 g of a white solid. The infrared absorption spectrum of the resulting solid is shown in FIG. 1. Based on its infrared absorption spectrum and chlorine content, the resulting solid was found to be a polyvinyl imidazoline hydrochloride of the aforementioned chemical formula (1). The polyvinyl imidazoline hydrochloride had a Huggins' constant k' of 0.41 and an intrinsic viscosity [η] of 8.0 based on measurements at 30° C. in a 0.1 mol/l aqueous solution of sodium chloride.

An aqueous solution (0.3% by weight) of the polyvinyl imidazoline hydrochloride was prepared, and subjected to performance evaluation (floc diameter, amount of filtrate after 60 seconds, water content of dehydrated cake). The results are shown in Table 1.

TABLE 1

| | Floc diameter (mm) | Amount of filtrate after 60 seconds (g) | Water content of dehydrated cake (%) |
|---|---|---|---|
| Ex. 1 | 3–4 | 192 | 79.5 |
| Ex. 2 | 3 | 186 | 78.5 |
| Ex. 3 | 4 | 199 | 79.1 |
| Comp. Ex. 1 | 1–2 | 173 | 80.5 |
| Comp. Ex. 2 | 2 | 178 | 80.1 |
| Comp. Ex. 3 | 1–2 | 172 | 80.0 |
| Comp. Ex. 4 | Not flocculated | Unfilterable | Cannot be dehydrated |

EXAMPLE 2

The same procedure as in Example 1 was performed, except that 10.0 g of the polyacrylonitrile obtained in Starting Material Production Example 2 was used instead of the polyacrylonitrile obtained in Starting Material Production Example 1. As a result, 19.1 g of a white solid was obtained. The resulting solid (5.0 g) was added to 300 ml of a methyl alcohol solution containing 10% by weight of hydrochloric acid. Then, the same procedure as in Example 1 was performed to obtain 4.8 g of a white solid. Its infrared absorption spectrum and chlorine content showed the resulting solid to be a polyvinyl imidazoline hydrochloride of the aforementioned chemical formula (1). The polyvinyl imidazoline hydrochloride had a Huggins' constant k' of 0.25 and an intrinsic viscosity [η] of 4.4 based on measurements at 30° C. in a 0.1 mol/l aqueous solution of sodium chloride.

An aqueous solution (0.3% by weight) of the polyvinyl imidazoline hydrochloride was prepared, and subjected to performance evaluation (floc diameter, amount of filtrate after 60 seconds, water content of dehydrated cake). The results are shown in Table 1.

EXAMPLE 3

The same procedure as in Example 1 was performed, except that 10.0 g of the polyacrylonitrile obtained in Starting Material Production Example 3 was used instead of the polyacrylonitrile obtained in Starting Material Production Example 1. As a result, 20.6 g of a white solid was obtained. The resulting solid (5.0 g) was added to 300 ml of a methyl alcohol solution containing 10% by weight of hydrochloric acid. Then, the same procedure as in Example 1 was performed to obtain 4.6 g of a white solid. Its infrared absorption spectrum and chlorine content showed the resulting solid to be a polyvinyl imidazoline hydrochloride of the aforementioned chemical formula (1). The polyvinyl imidazoline hydrochloride had a Huggins' constant k' of 0.50 and an intrinsic viscosity [η] of 6.9 based on measurements at 30° C. in a 0.1 mol/l aqueous solution of sodium chloride.

An aqueous solution (0.3% by weight) of the polyvinyl imidazoline hydrochloride was prepared, and subjected to performance evaluation (floc diameter, amount of filtrate after 60 seconds, water content of dehydrated cake). The results are shown in Table 1.

COMPARATIVE EXAMPLE 1

Performance evaluation (floc diameter, amount of filtrate after 60 seconds, water content of dehydrated cake) was made in the same manner as in the Examples, except for the use of a homopolymer of a methyl chloride quaternized product of dimethylaminoethyl methacrylate, a representative polymeric flocculent used in sewage treatment. The results are shown in Table 1.

COMPARATIVE EXAMPLE 2

The same procedure as in Example 1 was performed, except that 10.0 g of the polyacrylonitrile obtained in Starting Material Production Example 4 was used instead of the polyacrylonitrile obtained in Starting Material Production Example 1. As a result, 18.9 g of a white solid was obtained. The resulting solid (5.0 g) was added to 300 ml of a methyl alcohol solution containing 10% by weight of hydrochloric acid. Then, the same procedure as in Example 1 was performed to obtain 4.2 g of a white solid. Its infrared absorption spectrum and chlorine content showed the resulting solid to be a polyvinyl imidazoline hydrochloride of the aforementioned chemical formula (1). The polyvinyl imidazoline hydrochloride had a Huggins' constant k' of 0.14 and an intrinsic viscosity [η] of 5.5 based on measurements at 30° C. in a 0.1 mol/l aqueous solution of sodium chloride.

An aqueous solution (0.3% by weight) of the polyvinyl imidazoline hydrochloride was prepared, and subjected to performance evaluation (floc diameter, amount of filtrate after 60 seconds, water content of dehydrated cake). The results are shown in Table 1.

COMPARATIVE EXAMPLE 3

The same procedure as in Example 1 was performed, except that 10.0 g of the polyacrylonitrile obtained in Starting Material Production Example 5 was used instead of the polyacrylonitrile obtained in Starting Material Production Example 1. As a result, 22.0 g of a white solid was obtained. The resulting solid (5.0 g) was added to 300 ml of a methyl alcohol solution containing 10% by weight of hydrochloric acid. Then, the same procedure as in Example 1 was performed to obtain 4.9 g of a white solid. Its infrared absorption spectrum and chlorine content showed the resulting solid to be a polyvinyl imidazoline hydrochloride of the aforementioned chemical formula (1). The polyvinyl imidazoline hydrochloride had a Huggins' constant k' of 0.12 and an intrinsic viscosity [η] of 4.5 based on measurements at 30° C. in a 0.1 mol/l aqueous solution of sodium chloride.

An aqueous solution (0.3% by weight) of the polyvinyl imidazoline hydrochloride was prepared, and subjected to performance evaluation (floc diameter, amount of filtrate after 60 seconds, water content of dehydrated cake). The results are shown in Table 1.

COMPARATIVE EXAMPLE 4

The same procedure as in Example 1 was performed, except that 10.0 g of the polyacrylonitrile obtained in Starting Material Production Example 6 was used instead of the polyacrylonitrile obtained in Starting Material Production Example 1. As a result, 17.9 g of a white solid was obtained. The resulting solid (5.0 g) was added to 300 ml of a methyl alcohol solution containing 10% by weight of hydrochloric acid. Then, the same procedure as in Example 1 was performed to obtain 4.8 g of a white solid. Its infrared absorption spectrum and chlorine content showed the resulting solid to be a polyvinyl imidazoline hydrochloride of the aforementioned chemical formula (1). The polyvinyl imidazoline hydrochloride had a Huggins' constant k' of 0.35 and an intrinsic viscosity [η] of 1.5 based on measurements at 30° C. in a 0.1 mol/l aqueous solution of sodium chloride.

An aqueous solution (0.3% by weight) of the polyvinyl imidazoline hydrochloride was prepared, and subjected to performance evaluation (floc diameter, amount of filtrate after 60 seconds, water content of dehydrated cake). The results are shown in Table 1.

As described above, the use of the polymeric flocculent according to the invention makes it possible to form coarse flocs in sludge treatment, achieve satisfactory solid-liquid separation, and decrease the water content of sludge.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A process for preparing a branched polyvinyl imidazoline acid salt comprising:

reacting a branched polyacrylonitrile with ethylenediamine in the presence of ammonium chloride and/or a hydrochloride of an amine, thereby obtaining a polymer; and contacting said polymer with an acid, thereby obtaining the branched polyvinyl imidazoline acid salt of formula (1)

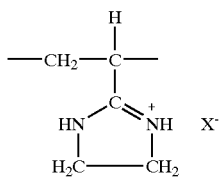

(1)

where X⁻ denotes a chlorine anion, a sulfuric acid anion, a carbonic acid anion, a p-toluenesulfonic acid anion, a formic acid anion, an acetic acid anion, or a propionic acid anion, having a Huggins' constant k', defined by the equation (1), $$\eta_{sp}/C = k'[\eta]^2 C + [\eta] \quad (1)$$

where $\eta_{sp}$ denotes a specific viscosity, C denotes a concentration of a polymer, $[\eta]$ denotes an intrinsic viscosity, and k' denotes a Huggins' constant, of 0.2 to 1.2 and an intrinsic viscosity $[\eta]$ of 2 to 20 based on measurements at 30° C. in a 0.1 mol/l aqueous solution of sodium chloride.

2. The process for preparing the branched polyvinyl imidazoline acid salt as claimed in claim 1, wherein the branched polyacrylonitrile has a Huggins' constant k', defined by the equation (1), of 0.2 to 1.2 and an intrinsic viscosity $[\eta]$ of 2 to 20 based on measurements at 30° C. in N,N-dimethylforniamide.

3. The process for preparing the branched polyvinyl imidazoline acid salt as claimed in claim 1 or 2, wherein the acid is hydrochloric acid, sulfuric acid, carbonic acid, p-toluenesulfonic acid, formic acid, acetic acid, or propionic acid.

4. The process according to claim 1, wherein said Huggins' constant is in the range of 0.3 to 1.0.

5. The process according to claim 1, wherein said Huggins' constant is in the range of 0.3 to 0.5.

6. The process according to claim 1, wherein said intrinsic viscosity is in the range of 4 to 15 dl/g.

7. The process according to claim 1, wherein said anion is selected from the group consisting of a chlorine anion, a sulfuric acid anion, or an acetic acid anion.

8. The process according to claim 1, wherein said anion is a chlorine anion.

9. A branched polyvinyl imidazoline acid salt prepared by the process according to claim 1.

10. A method of treating waste water comprising:
   i) forming an aqueous solution comprising said branched polyvinyl imidazoline acid salt of claim 9;
   ii) mixing said aqueous solution with a waste water slurry comprising an organic sludge to form flocs; and
   iii) dehydrating said flocs to obtain a dehydrated cake.

11. The method of treating waste water as claimed in claim 10, further comprising drying said dehydrated cake at a reduced pressure and an elevated temperature.

12. The method of treating waste water as claimed in claim 10, wherein said organic sludge is at least one organic sludge selected from the group consisting of raw sludge, surplus sludge, concentrated sludge, digested sludge in excrement treatment, and sludge occurring in activated sludge treatment of industrial waste water other than sewage.

13. The method of treating waste water as claimed in claim 10, wherein said branched polyvinyl imidazoline acid salt is added in an amount of 0.01 to 0.5% by weight, based on the a solids content of said waste water slurry.

14. The method of treating waste water as claimed in claim 10, wherein said branched polyvinyl imidazoline acid salt is added in an amount of 0.1 to 1.2% by weight, based on the a solids content of said waste water slurry.

15. The method of treating waste water as claimed in claim 10, wherein said waste water slurry comprising said sludge to be treated has a pH in the range of from 3.5 to 8.0.

16. The method of treating waste water as claimed in claim 10, wherein said dehydrating is carried out in a dehydrator.

17. The method of treating waste water as claimed in claim 16, wherein said dehydrator is selected from the group consisting of a belt press, a screw press, a filter press, and a super decanter.

* * * * *